United States Patent
Elliott et al.

(10) Patent No.: US 9,777,552 B2
(45) Date of Patent: Oct. 3, 2017

(54) VALVE SYSTEM HAVING A SOFT LANDING PLUG

(71) Applicant: Cameron International Corporation, Houston, TX (US)

(72) Inventors: Declan Elliott, Longford (IE); Michael Anthony McKeon, Longford (IE)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 14/843,600

(22) Filed: Sep. 2, 2015

(65) Prior Publication Data

US 2017/0058633 A1 Mar. 2, 2017

(51) Int. Cl.
| | |
|---|---|
| *F16K 3/24* | (2006.01) |
| *E21B 34/02* | (2006.01) |
| *F16K 47/02* | (2006.01) |
| *E21B 21/10* | (2006.01) |
| *F16K 31/50* | (2006.01) |

(52) U.S. Cl.
CPC .............. *E21B 34/02* (2013.01); *E21B 21/10* (2013.01); *F16K 3/246* (2013.01); *F16K 31/508* (2013.01); *F16K 47/023* (2013.01)

(58) Field of Classification Search
CPC ........ F16K 47/00; F16K 47/02; F16K 47/023; F16K 47/04; F16K 47/08; F16K 3/0218; F16K 3/0227; F16K 3/0254; F16K 3/24; F16K 3/243; F16K 3/246; E21B 34/02; E21B 21/10
USPC ......................................................... 251/122
See application file for complete search history.

(56) References Cited

U.S. PATENT DOCUMENTS

| | | | | |
|---|---|---|---|---|
| 2,635,846 | A * | 4/1953 | Smith ...................... | F16K 1/36 251/120 |
| 3,211,419 | A * | 10/1965 | Klinger-Lohr ............ | F16K 1/36 137/630.15 |
| 3,920,044 | A * | 11/1975 | Gruner .................... | F16K 47/04 137/625.3 |

(Continued)

FOREIGN PATENT DOCUMENTS

| | | | |
|---|---|---|---|
| DE | EP 0286947 A1 * | 10/1988 | ......... F16K 17/0433 |
| GB | 546800 A | 7/1942 | |
| WO | 2006/060164 A2 | 6/2006 | |

OTHER PUBLICATIONS

Machine Translation for EP0286947A1.*
PCT International Search Report and Written Opinion; Application No. PCT/US2016/050009; Dated Dec. 5, 2016; 14 pages.

*Primary Examiner* — Mary McManmon
*Assistant Examiner* — Ian Paquette
(74) *Attorney, Agent, or Firm* — Fletcher Yoder, P.C.

(57) ABSTRACT

A choke valve system includes a choke valve having a body and an annular seat disposed within the body. The choke valve also includes a plug configured to move relative to the annular seat between an open position in which a fluid is enabled to flow through the choke valve and a closed position in which the fluid is blocked from flowing through the choke valve and in which the plug contacts an annular seating surface of the annular seat. The choke valve further includes a damper coupled to the plug, and the damper is configured to absorb a load generated by contact between the plug and the annular seating surface of the annular seat as the plug moves into the closed position.

20 Claims, 3 Drawing Sheets

(56) References Cited

U.S. PATENT DOCUMENTS

| | | | |
|---|---|---|---|
| 4,057,072 A * | 11/1977 | Cook | F16K 17/0433 |
| | | | 137/115.18 |
| 4,100,933 A | 7/1978 | Davey et al. | |
| 5,295,662 A * | 3/1994 | Yamaji | F16K 41/12 |
| | | | 251/274 |
| 6,443,182 B1 | 9/2002 | Hathcock | |
| 2007/0040136 A1 * | 2/2007 | Caprera | F16K 1/482 |
| | | | 251/122 |
| 2016/0146366 A1 * | 5/2016 | Takahashi | F16K 31/048 |
| | | | 251/129.15 |

* cited by examiner

VALVE SYSTEM HAVING A SOFT LANDING PLUG

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

In certain fluid-handling systems, such as mineral extraction systems, a variety of flow control devices are used to control a flow rate, a pressure, and other parameters of a fluid flow. For example, in mineral extraction systems, choke valves may be utilized to regulate the flow of production fluid (e.g., oil, gas, and water) from a well. These valves may include a choke body with a movable valve member (e.g., a plug) disposed therein. An actuator drives the movable valve member over an opening of the choke body through which the fluid flows. By shifting the position of the movable valve member relative to the opening, the size of the opening may be increased or decreased, and the flow rate of the fluid may be adjusted. The construction of the choke valve can significantly impact wear on the movable valve member and/or other components of the choke valve. Therefore, it would be desirable to improve the construction of the choke valve.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

Figure 1:
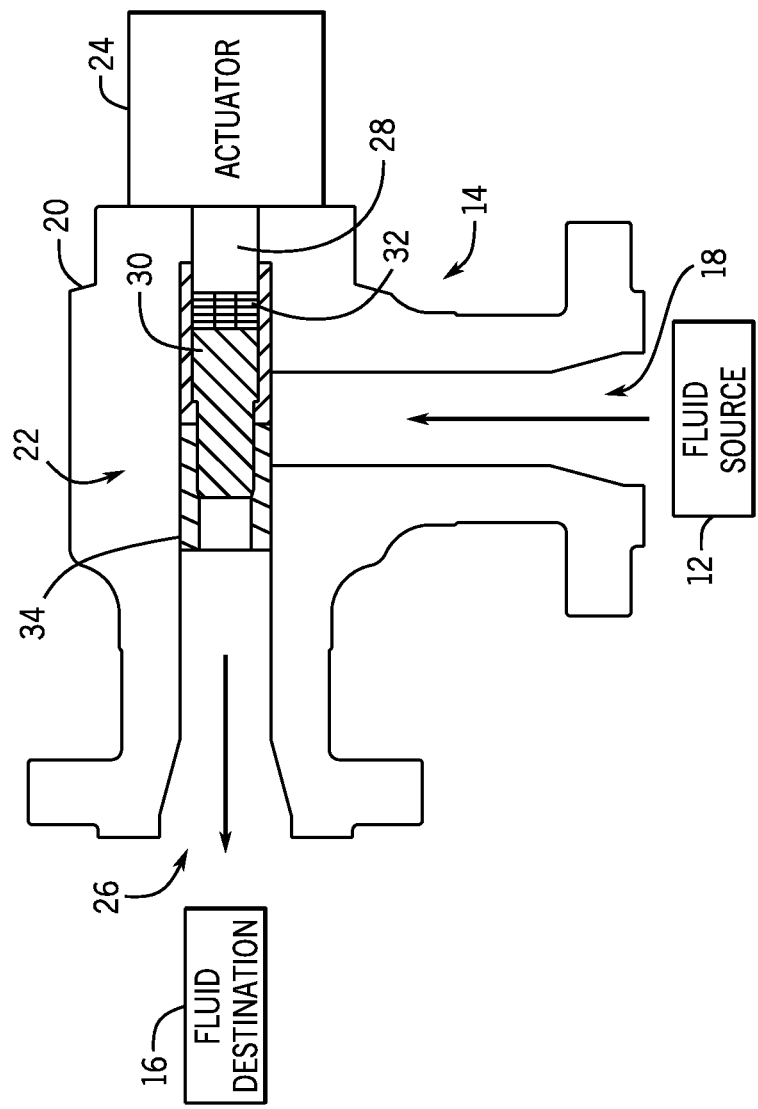
FIG. 1 is a schematic of a fluid-handling system including a choke valve, in accordance with an embodiment of the present disclosure.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," "said," and the like, are intended to mean that there are one or more of the elements. The terms "comprising," "including," "having," and the like are intended to be inclusive and mean that there may be additional elements other than the listed elements. The use of "top," "bottom," "above," "below," and variations of these terms is made for convenience, but does not require any particular orientation of the components relative to some fixed reference, such as the direction of gravity. The term "fluid" encompasses liquids, gases, vapors, and combinations thereof.

Embodiments of the present disclosure are directed toward fluid-handling systems, such as a fluid-handling system for a mineral extraction system. The systems include a choke valve having a choke body and a choke trim configured to be disposed within the choke body. In the disclosed embodiments, the choke valve may include a shock absorption system (e.g., damping system). The shock absorption system may include one or more shock absorbers or dampers, such as mechanical dampers, material dampers, fluid dampers, or any combination thereof. Mechanical dampers may include one or more springs, such as stacked tapered annular washers, concentric coil springs, or the like. Material dampers may include resilient or elastic material, such as elastomer, rubber, or the like. Fluid dampers may include fluid compression chambers. The disclosed shock absorption system may include 1, 2, 3, 4, 5, 6, 7, 8, 9, 10, or more dampers of similar or different construction, compressibility, or spring force, for example.

To facilitate discussion, the illustrated embodiments include one or more springs positioned between a plug and a shaft of the choke trim. However, it should be understood that any suitable damper, such as those noted above, may be provided in addition to or in place of the springs (e.g., between the plug and the shaft). An actuator may drive the choke trim, or a portion of the choke trim, relative to an opening of the choke body through which the fluid flows. The choke trim may be driven between an open position in which fluid flows through the opening and a closed position in which fluid is blocked from flowing through the opening to adjust a flow rate of the fluid. In the open position, the plug does not contact an annular seating surface that is disposed within the choke body. In the closed position, the plug contacts the annular seating surface of an annular seat that is disposed within the choke body, which may reduce the flow rate of the fluid to zero or near-zero. In the disclosed embodiments, the spring may absorb and dampen a load generated by moving the plug into the closed position against the annular seating surface of the annular seat (e.g., the load generated by "seating" the plug). Thus, the spring may enable seating of the plug with a controlled load and/or may reduce internal stresses within components (e.g., the seat and the plug) of the choke valve, thereby protecting such components of the choke valve from heavy loads and fractures and reducing wear on the components, for example Advantageously, the spring may enable the actuator to drive the plug into a seated position with a relatively low load, thereby reducing a risk of the plug becoming jammed (e.g., wedged) in the seat and enabling removal of the plug from the seat by the actuator without breaking the plug, for example.

FIG. 1 illustrates an embodiment of a fluid-handling system 10. The fluid-handling system 10 may be part of an energy-acquisition or processing system, e.g., a hydrocarbon-production or processing system, such as a subsea or surface oil or gas well. In some embodiments, the fluid-handling system 10 may be a gas-uplift system, a water-injection system, a water/steam/chemicals injection system, or other system for conveying fluids. The fluid-handling system 10 includes a fluid source 12, a choke valve 14, and a fluid destination 16. The fluid source 12 may include a variety of fluid sources, such as an oil or natural gas well. The fluid source 12 may supply a variety of fluids, such as air, natural gas, oil, water (steam or liquid), or combinations thereof. The fluid arriving from the source 12 may be at relatively high pressures, e.g., pressures greater than 500 psi, 1000 psi, 5000 psi, 10,000 psi, 15,000 psi, 20,000 psi, 25,000 psi, or 30,000 psi. Additionally, the pressure of the fluid arriving from the source 12 may be higher than the pressure of the fluid destination 16.

The choke valve 14 includes an inlet 18, a choke body 20 (e.g., a production choke body and/or a universal choke body), a choke trim 22 disposed within the choke body 20, an actuator 24, and a fluid outlet 26. The actuator 24 may modulate flow between the inlet 18 and the outlet 26 by adjusting the position of the choke trim 22 or a component of the choke trim 22 relative to the choke body 20. For example, the actuator 24 may be a manual actuator (e.g., a wheel), an electro-mechanical actuator (e.g., an electric drive or motor), a hydraulic actuator (e.g., a fluid driven actuator), or other suitable type of actuator. To adjust the position of the choke trim 22 or a component of the choke trim 22, the actuator 24 may exert a translational force on a shaft 28 coupled to the actuator 24 and the choke trim 22 or the component of the choke trim 22.

As mentioned above, the choke trim 22 may include a spring-loaded plug 30. In some such embodiments, one or more springs 32 may be disposed between the plug 30 and the shaft 28. The spring 32 may be any suitable biasing member, such as a series (e.g., stack) of tapered annular washers (e.g., Bellville washers), one or more coil springs (e.g., stacked or concentric springs), an elastic material (e.g., a ring made of rubber or elastomer), or any combination thereof. As discussed in more detail below, during movement of the choke trim 22 to a closed position in which the plug 30 is fully seated within a seat 34 (e.g., an annular seat), the spring 32 may advantageously reduce a load applied by the plug 30 to the seat 34, thereby reducing wear on certain components of the choke valve 14.

Figure 2:
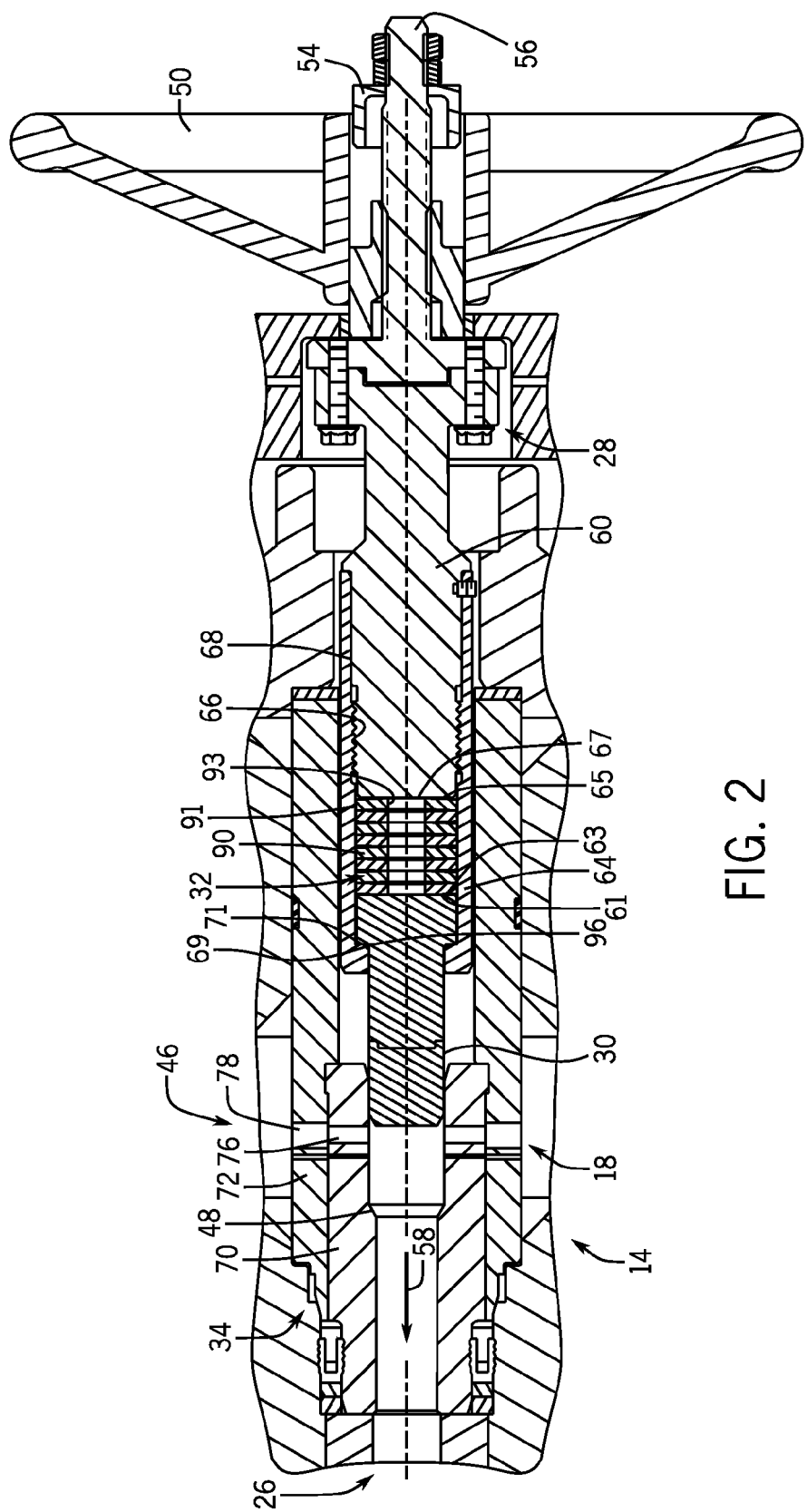
FIG. 2 is a cross-sectional side view of a portion of the choke valve of FIG. 1, illustrating a spring-loaded plug in an open position within a choke body of the choke valve, in accordance with an embodiment of the present disclosure.

FIG. 2 is a cross-sectional side view of a portion of an embodiment of the choke valve 14, illustrating the plug 30 in an open position 46 within the choke body 20 of the choke valve 14. In the open position 46, the plug 30 does not cover the inlet 18, thereby enabling fluid to flow between the inlet 18 and the outlet 26 of the choke valve 14. As shown, in the open position 46, the plug 30 does not contact an annular seating surface 48 of the annular seat 34. While the annular seating surface 48 shown in FIG. 2 is generally perpendicular to the outlet axis 58 of the choke valve 14, it should be understood that the annular seating surface 48 may have any suitable shape or configuration. For example, the annular seating surface 48 may be angled relative to the outlet axis 58 (e.g., tapered between a radially outer edge and a radially inner edge of the annular seating surface 48 in a direction parallel to the outlet axis 58).

In the illustrated embodiment, the actuator 24 is a manual actuator that includes a wheel 50, a threaded bushing 54, and an upper stem 56 of the shaft 28. Each of these components 50, 54, and 56 may be generally coaxial with an axial axis 58 (e.g., outlet axis) of the choke valve 14. The wheel 50 is configured to rotate about the outlet axis 58, thereby driving engagement of the threaded bushing 54 and axially pushing or pulling the upper stem 56. The upper stem 56 may couple to the choke trim 22 and move the choke trim 22 as the wheel 50 is rotated. In some embodiments, the upper stem 56 may be coupled to the choke trim 22 via a lower stem 60, which is supported by a bonnet 62 coupled to the choke body 20. Rotational motion of the wheel 50 is transferred to the lower stem 60 via the upper stem 56. In certain embodiments, the lower stem 60 may convert the rotational motion of the upper stem 56 into linear motion to enable linear movement (e.g., along the axial axis 58) of the choke trim 22 relative to the choke body 20. As mentioned above, some embodiments may include other types of actuators 24 (e.g., an electric actuator, a hydraulic actuator, or a pneumatic actuator), and the actuator 24 may be coupled to the choke trim 22 via any suitable structure.

In the illustrated embodiment, a sleeve 64 (e.g., an annular sleeve or an annular retainer) circumferentially surrounds and supports at least a portion of the plug 30, at least a portion of the lower stem 60, and/or the spring 32. In certain embodiments, the sleeve 64 may be coupled to the lower stem 60 by any suitable technique or device (e.g., epoxy, shrinkfit, a threaded fastener, or the like). For example, a radially-inner surface 66 of the sleeve 64 and a radially-outer surface 68 of the lower stem 60 may included corresponding threaded surfaces to facilitate fixed attachment of the sleeve 64 to the lower stem 60. Thus, the sleeve 64 may be configured to move with the lower stem 60.

The plug 30 may be made of tungsten carbide or any other appropriate erosion resistant materials. In some embodiments, the plug 30 or other components of the choke valve 14 may include materials of lesser erosion resistance that are coated with erosion resistant materials, such as tungsten carbide or a diamond-type coating material. As shown, a first end 61 (e.g., a proximal end) of the plug 30 is coupled to a first end 63 (e.g., a distal end) of the spring 32, and a second end 65 (e.g., a proximal end) of the spring 32 is coupled to a first end 67 (e.g., a distal end) of the lower stem 60. Thus, the spring 32 is positioned axially between the plug 30 and the lower stem 60 along the axial axis 58, and the spring 32 is positioned in an axial gap between the plug 30 and the lower stem 60. These components (e.g., the plug 30, the spring 32, and/or the lower stem 60) may be welded to one another and/or may be fastened to one another via any suitable fastener, such as a threaded fastener. The spring 32 may be configured to bias the plug 30 against an axially-facing surface 69 (e.g., an annular surface) of the sleeve 64 while the choke trim 22 is in the open position 46. Thus, as shown, an axially-facing surface 71 (e.g., an annular surface) of the plug 30 may contact the axially-facing surface 69 of the sleeve 64 while the choke trim 22 is in the open position 46.

In the illustrated embodiment, the spring 32 includes a series of tapered annular washers 90 (e.g., Bellville washers) each having a conical or tapered shape (e.g., tapered or inclined between a radially-outer edge 91 and a radially-inner edge 93). As noted above, the spring 32 may be any suitable biasing member, such as the annular washers 90, one or more coil springs, an elastic material, or any combination thereof. The spring 32 is configured to be loaded along the axial axis 58 (e.g., in a direction parallel to the axial axis 58). As noted above, the spring 32 may be supported by and/or maintained in axial alignment by the sleeve 64 (e.g., the washers 90 may be maintained in axial alignment with one another), which is configured to contact the radially-outer edge 91 of the spring 32 and circumferentially surround the spring 32. In the open position 46, the spring 32 is in an uncompressed (e.g., extended) position and biases the plug 30 axially (e.g., along the axial axis 58) toward the seat 34 such that the axially-facing surface 71 of the plug 30 engages (e.g., contacts) the axially-facing surface 69 of the sleeve 64.

As shown, the plug 30 is disposed within the seat 34. In some embodiments, the seat 34 may include inner and outer cages (e.g., throttling members and/or annular throttling members) 70 and 72, and the inner and outer cages 70 and 72 may each include a plurality of openings 76 and 78, respectively. In the illustrated embodiment, the openings 76 and 78 are generally coaxial with each other and extend generally radially from the axial axis 58 at different positions about the axial axis 58. As shown, the openings 76 and 78 may enable fluid flows (e.g., liquid fluid flow) through the choke valve 14 from the inlet 18 to the outlet 26. However, flow may be impeded through the choke valve 14 by varying the position of the plug 30 within the seat 34. Specifically, in operation, flow through the choke valve 14 may be adjusted by manipulating the actuator 54. For example, as explained above, rotating the wheel 50 causes the upper stem 56 to translate axially along the axial axis 58. This movement drives the plug 30 between the open position 46 and a closed position, as discussed with respect to FIG. 3 below, thereby blocking or exposing the openings 76 and 78 to the flow. As will be appreciated, the flow rate through the choke valve 14 varies based on the position of the plug 30. The openings 76 and 78 may be partially or substantially entirely obstructed by the plug 30, thereby impeding a portion or all of the flow.

Figure 3:
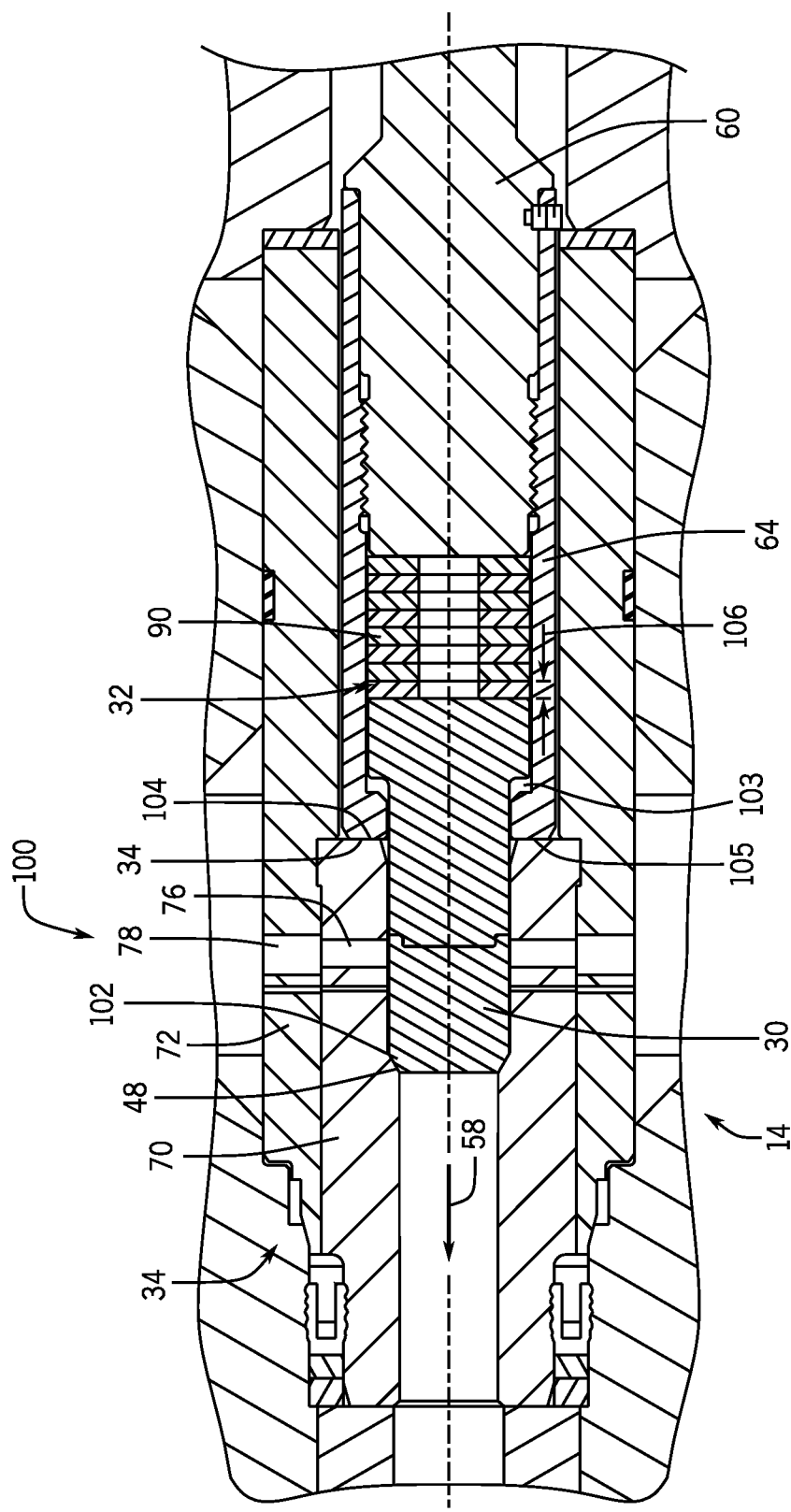
FIG. 3 is a cross-sectional side view of a portion of the choke valve of FIG. 1, illustrating the spring-loaded plug in a closed position within the choke body of the choke valve, in accordance with an embodiment of the present disclosure.

FIG. 3 is a cross-sectional side view of the choke valve 14, illustrating the plug 30 in a closed position 100 (e.g., fully closed or seated position) within the choke body 20 of the choke valve 14, in accordance with an embodiment of the present disclosure. In the closed position 100, the plug 30 contacts the annular seating surface 48 of the seat 34 and covers the openings 76, 78, thereby blocking fluid flow through the choke valve 14. As discussed above, the actuator 54 may modulate fluid flow through the choke valve 14 by adjusting the plug 30 of the choke trim 22 between the open position 48 and the closed position 100.

In the closed position 100, a distal surface 102 (e.g., distal end) of the plug 30 contacts the annular seating surface 48 of the seat 34. As the plug 30 is urged into the closed position 100 and contacts the annular seating surface 48 of the seat 34, the spring 32 compresses along the axial axis 58 to absorb and dampen a load generated by moving the plug 30 into the closed position 100 against the annular seating surface 48 of the seat 34. Thus, the spring 32 may enable seating of the plug 30 with a controlled load, thereby reducing stress and/or wear on the plug 30, the seat 34, and/or other components of the choke valve 14, for example. In typical choke valves, the load applied by the typical actuator may overload the plug 30, causing stress and/or causing the plug 30 to become jammed (e.g., wedged or immovably lodged) within the seat 34. Accordingly, in the present embodiments, the load applied by the actuator 54 to urge the plug 30 into the closed position 100 may be low such that the plug 30 does not fracture due to internal stress and/or such that the plug 30 is not jammed within the seat 34 and can be removed by the actuator 54. As shown, a gap 103 may be generated between the axially-facing surface 69 of the plug 30 and the axially-facing surface 71 of the sleeve 64 as the plug 30 is moved into the closed position 100. In some embodiments, the actuator 24 may drive the lower stem 60 along the axial axis 58 until an axially-facing surface 104 of the sleeve 64 contacts an axially-facing surface 105 of the seat 34. As noted above, in certain embodiments the springs 32 may include the annular washers 90. In some such cases, each of the annular washers 90 may have a height 106 (e.g., along the axial axis 58) of approximately 2, 3, 4, 5, 6, 7, 8, 9, 10, or more millimeters (mm) when the spring 32 is in an uncompressed position. In some embodiments, the height 106 of each annular washer 90 may be between approximately 1 and 20, 2 and 10, or 3 and 6 mm when the spring 32 is in the uncompressed position. Each annular washer 90 may be configured to move into a compressed position in which the height 106 is reduced. For example, the height 106 of each annular washer 90 may be reduced by approximately 0.5, 0.6, 0.7, 0.8, 0.9, 1, 1.1, 1.2, 1.3, 1.4, 1.5, 1.6, 1.7, 1.8, 1.9, or 2 mm when the plug 30 is moved from the open position 46 to the closed position 100. In some embodiments, the height 106 may be reduced by between approximately 0.5 and 2, 1 and 1.7, or 1.3 and 1.5 mm when the plug 30 is moved from the open position 46 to the closed position 100. In some embodiments, the height 106 of each annular washer 90 may be reduced by between approximately 1 to 50, 5 to 40, or 10 to 30, or 15 to 25 percent.

Regardless of the form of the spring 32 (e.g., the annular washers 90, one or more coil springs, an elastic material, or any combination thereof), the spring 32 may be configured to move from an uncompressed position to a compressed position in which an axial height of the spring 32 is reduced. In some embodiments, the height of the spring 32 may be reduced by between approximately 1 to 50, 5 to 40, or 10 to 30, or 15 to 25 percent between the uncompressed and the compressed positions. In certain embodiments, the spring 32 may be configured to absorb (e.g., store) a force of approximately 5,000 to 30,000 Newtons when the plug 30 is moved from the open position 46 to the closed position 100. In certain embodiments, the spring 32 may be configured to absorb a force of approximately 8,000 to 25,000, 9,000 to 20,000, or 10,000 to 15,000 Newtons when the plug 30 is moved from the open position 46 to the closed position 100. As discussed above, the spring 32 may absorb and dampen a load generated by moving the plug 30 into the closed position 100 against the annular seating surface 48 of the seat 34. Thus, the spring 32 may enable seating of the plug 30 with a controlled load, thereby reducing wear on components of the choke valve 14, for example. By absorbing the load generated by moving the plug 30 into the closed position 100, the spring 32 may also enable use of a more powerful actuator 24. The relatively powerful actuator 24 may also facilitate removal of the plug 30 from the seat 34.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:
1. A system, comprising:
  a choke valve, comprising:
    a body;

an annular seat disposed within the body, wherein the annular seat includes an annular seating surface that extends radially-inwardly relative to an axial axis of the choke valve; and a plug configured to move relative to the annular seat between an open position in which a fluid is enabled to flow through the choke valve and in which a first end portion of the plug does not contact the annular seating surface of the annular seat and a closed position in which the fluid is blocked from flowing through the choke valve and in which the first end portion of the plug contacts the annular seating surface of the annular seat;

a damper coupled to a second end portion of the plug opposite the first end portion, wherein the damper is configured to absorb a load generated by contact between the first end portion of the plug and the annular seating surface of the annular seat as the plug moves into the closed position; and an annular sleeve configured to circumferentially surround the damper and at least a portion of the plug.

2. The system of claim 1, wherein the damper is configured to be in an uncompressed configuration while the plug is in the open position and in at least a partially compressed configuration while the plug is in the closed position.

3. The system of claim 1, wherein the damper comprises a plurality of tapered annular washers stacked along the axial axis of the choke valve.

4. The system of claim 1, comprising a shaft extending along the axial axis of the choke valve, wherein the shaft is fixed to a first axial end portion of the damper and the second end portion of the plug is fixed to a second axial end portion of the damper, opposite the first axial end portion.

5. The system of claim 4, comprising an actuator, wherein the shaft extends between the first axial end portion of the damper and the actuator, and the actuator is configured to drive the shaft along the axial axis of the choke valve to cause the plug to move between the open position and the closed position.

6. The system of claim 4, wherein the annular sleeve is configured to circumferentially surround the damper, at least a portion of the plug, and at least a portion of the shaft, and the annular sleeve is fixedly coupled to the shaft.

7. The system of claim 1, wherein an axially-facing surface of the annular sleeve is configured to engage an axially-facing surface of the plug while the plug is in the open position.

8. The system of claim 7, wherein the damper comprises a spring and is configured to bias the plug against the axially-facing surface of the annular sleeve while the plug is in the open position.

9. The system of claim 8, wherein the damper enables formation of a gap between the axially-facing surface of the plug and the axially-facing surface of the annular sleeve while the plug is in the closed position.

10. A choke valve system, comprising:
a choke trim configured to be supported within a choke valve body, the choke trim comprising:
a shaft configured to be coupled to an actuator configured to drive the choke trim relative to the choke valve body between a closed position and an open position;
a plug configured to cover an opening in the choke valve body to block a flow of fluid through the opening while the choke trim is in the closed position and to expose the opening in the choke valve body to enable the flow of fluid through the opening while the choke trim is in the open position; and a damper positioned between the shaft and a proximal end portion of the plug, wherein the shaft is fixed to a first axial end portion of the damper and the proximal end portion of the plug is fixed to a second axial end portion of the damper, opposite the first axial end portion, and the damper is configured to absorb a load generated by contact between a distal end portion of the plug and an annular seating surface that extends radially-inwardly relative to an axial axis of the choke valve body as the plug moves into the closed position.

11. The system of claim 10, wherein the damper comprises a plurality of tapered annular washers stacked along the axial axis of the choke valve.

12. The system of claim 10, comprising an annular sleeve configured to circumferentially surround the damper, at least a portion of the plug, and at least a portion of the shaft.

13. The system of claim 12, wherein an axially-facing surface of the annular sleeve is configured to engage an axially-facing surface of the plug while the choke trim is in the open position.

14. The system of claim 13, wherein the damper comprises a spring and is configured to bias the plug against the axially-facing surface of the annular sleeve while the choke trim is in the open position.

15. The system of claim 13, wherein the damper enables formation of a gap between the axially-facing surface of the plug and the axially-facing surface of the annular sleeve while the plug is in the closed position.

16. A choke valve system, comprising:
a plug configured to be supported within a choke valve body, wherein the plug is configured to cover an opening in the choke valve body to block a flow of fluid through the opening while the plug is in the closed position and to expose the opening in the choke valve body to enable the flow of fluid through the opening while the plug is in the open position, wherein a first end portion of the plug is configured to contact an annular seating surface that extends radially-inwardly relative to an axial axis of the choke valve body while the plug is in the closed position;
a damper coupled to a second end portion of the plug, opposite the first end portion, wherein the damper is configured to be positioned between the plug and an actuator configured to drive the plug between the open position and the closed position, and the damper is configured to absorb a load generated by contact between the first end portion of the plug and the annular seating surface of the annular seat as the plug moves into the closed position; and
an annular sleeve configured to circumferentially surround and support the damper and at least a portion of the plug.

17. The system of claim 16, wherein the damper is configured to bias the plug against an axially-facing surface of the annular sleeve while the choke trim is in the open position.

18. The system of claim 16, wherein the annular sleeve is configured to circumferentially surround and support the damper and at least a portion of the plug and a shaft coupled to the damper and configured to be coupled to the actuator, wherein the annular sleeve is threadably coupled to the shaft via a threaded fastener.

19. The system of claim 16, wherein the damper comprises a spring having a plurality of tapered annular washers stacked along the axial axis of the choke valve.

20. The system of claim 16, wherein the damper enables formation of a gap between an axially-facing surface of the plug and an axially-facing surface of the annular sleeve while the plug is in the closed position.

\* \* \* \* \*